Feb. 22, 1944.  W. E. ROUSE ET AL  2,342,224
POWER TRANSMISSION
Filed March 31, 1941  3 Sheets-Sheet 1

INVENTORS
WARREN E. ROUSE
JAMES ROBINSON &
JOHN D. DIETIKER
BY Ralph L. Tweedale
ATTORNEY

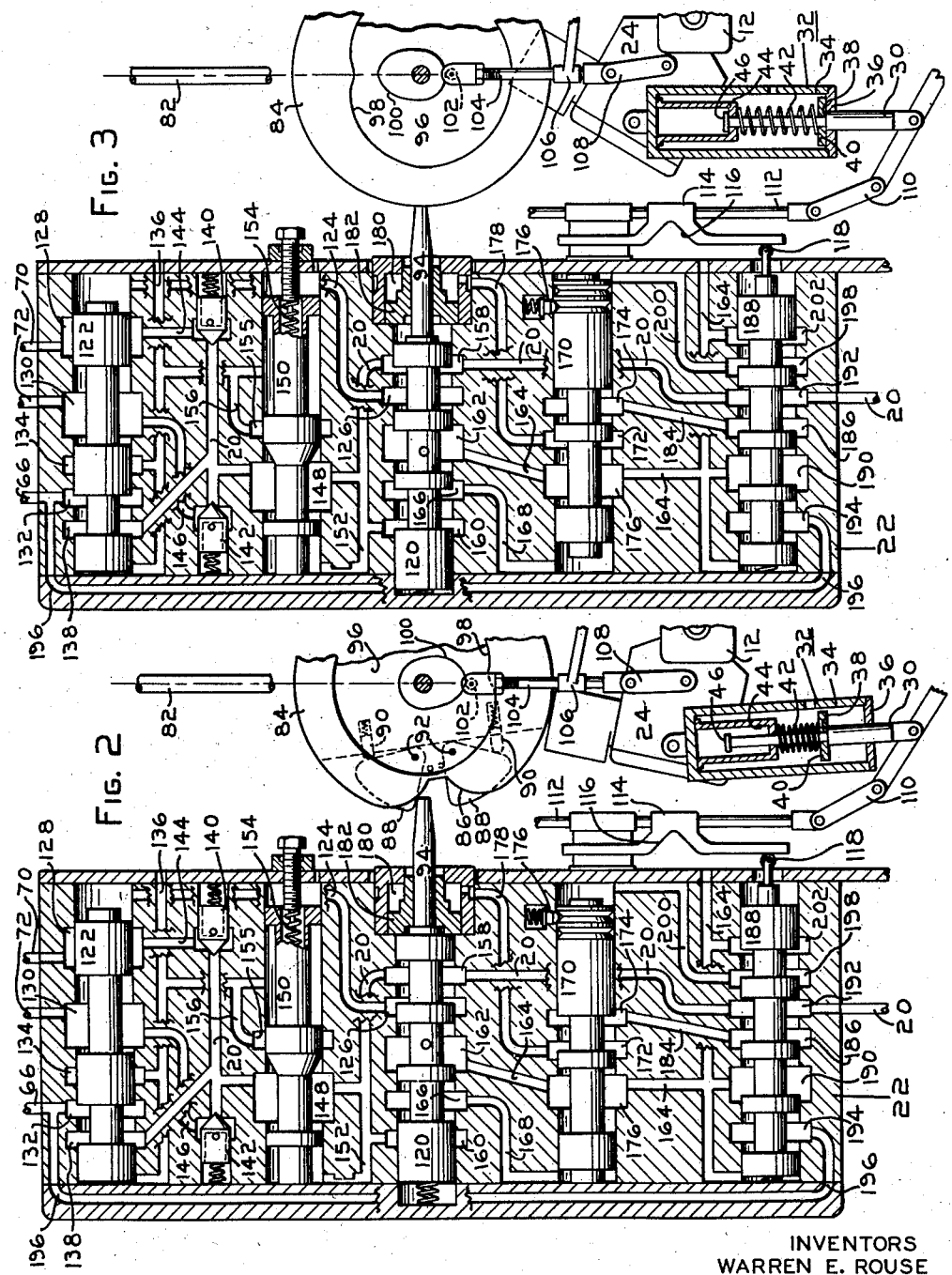

Feb. 22, 1944.   W. E. ROUSE ET AL   2,342,224
POWER TRANSMISSION
Filed March 31, 1941   3 Sheets-Sheet 3
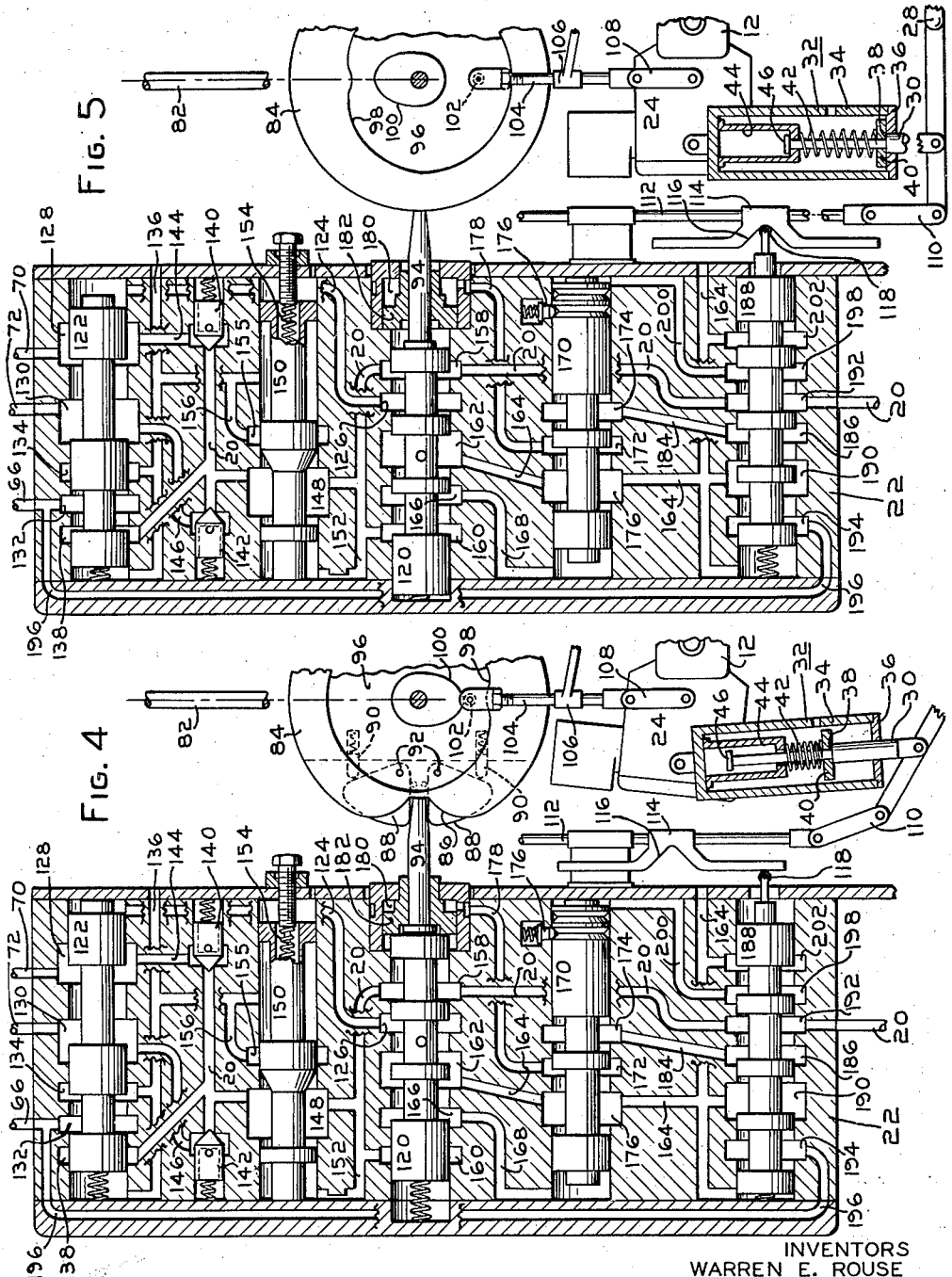
INVENTORS
WARREN E. ROUSE
JAMES ROBINSON &
JOHN D. DIETIKER
BY
*Ralph L. Tweedale*
ATTORNEY Patented Feb. 22, 1944

2,342,224

UNITED STATES PATENT OFFICE 2,342,224

POWER TRANSMISSION

Warren E. Rouse, Birmingham, and James Robinson and John D. Dietiker, Detroit, Mich., assignors to Vickers Incorporated, Detroit, Mich., a corporation of Michigan Application March 31, 1941, Serial No. 386,054

7 Claims. (Cl. 60—53)

This invention relates to power transmissions, particularly to those of the type comprising two or more fluid pressure energy translating devices, one of which may function as a pump and another as a fluid motor.

The invention is more particularly concerned with a power transmission system of this character incorporating an improved single-cycle control mechanism, that is, one in which the operation of the motor will be automatically terminated after a predetermined movement or cycle. It is frequently desirable to drive a load device in steps of predetermined length under automatic control after manual or other initiating action, as, for example, in driving a large rotary casting machine carrying molds to be filled with molten metal by bringing each mold in turn into position under a pouring spout.

It is furthermore necessary that the load be gradually accelerated and decelerated at the beginning and end of each cycle of movement to avoid spilling of the molten metal and to avoid overloading the prime mover by attempting to accelerate the large mass of the casting wheel too rapidly.

It is an object of the present invention to provide an improved hydraulic transmission system and control therefor wherein a predetermined cycle of movement may be initiated manually or otherwise in accordance with the above requirements.

It is a further object to provide a system of this character wherein the drive is under manual control at all times and may be stopped and restarted at any point of the cycle.

It is also an object to provide in a control system of this character an interlocking arrangement such that, after a cycle has been automatically terminated, a second cycle cannot be restarted until the manual starting control has been returned to its neutral position, that is, one in which the cycle will not repeat if the starting means is continuously held in starting position.

Further objects and advantages of the present invention will be apparent from the following description, reference being had to the accompanying drawings wherein a preferred form of the present invention is clearly shown.

In the drawings:

Figures 2 through 5 are views corresponding to a portion of Figure 1 showing the parts in various possible positions during a cycle.

Figure 1:
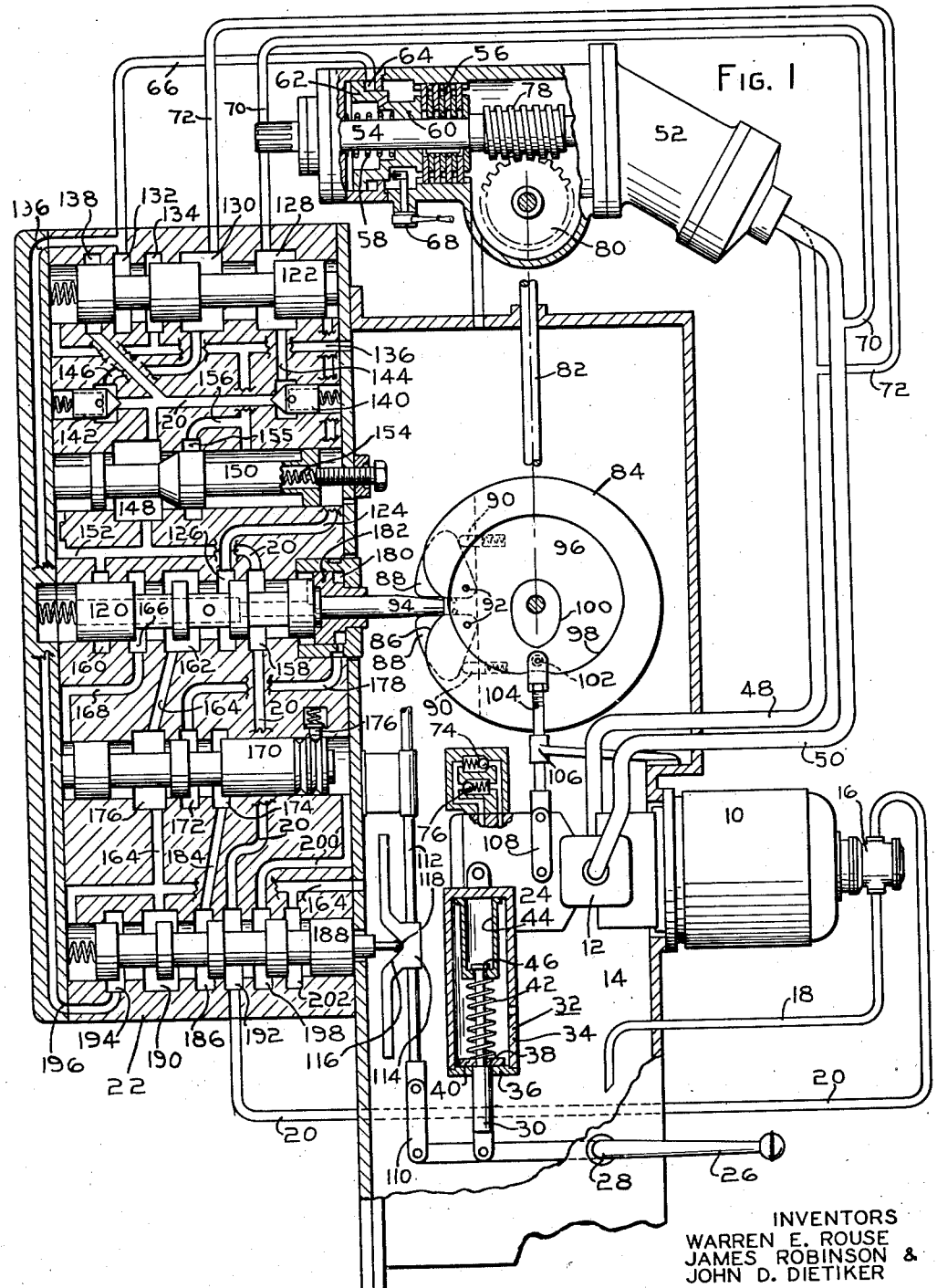
Figure 1 is a diagrammatic view of a power transmission system incorporating a preferred form of the present invention.

Referring now to the drawings, there is illustrated a prime mover indicated by an electric motor 10 adapted to drive a variable stroke, reversible pump 12 of well-known construction. The pump and motor are preferably mounted in the side walls of an oil reservoir or tank 14 in which a supply of operating fluid is maintained. The motor 10 at its opposite end may drive a small, fixed displacement, auxiliary pump 16 having a suction conduit 18 connected with the tank and a delivery conduit 20 connected with a control valve block 22 mounted on the opposite side wall of the tank 14.

The pump 12 has a swinging yoke 24 which may be adjusted to various positions, upwardly or downwardly from the neutral position shown, to control the rate and direction of fluid delivery in the well-known manner. The primary control of the position of yoke 24 is from a manually-operable lever 26 pivoted at 28 and connected with the yoke 24 by a link 30 having a yielding lost motion connection 32 therein.

The connection 32 may consist of a tube 34 pivotally connected with the yoke 24 and having an end cap 36 slidably mounted on the link 30. Flush with the inner surface of end cap 36, the link 30 is provided with a shoulder 38, and a spring abutment washer 40 is slidable on the reduced upper portion of link 30 and rests in the normal position upon the shoulder 38 and also upon the inner surface of cap 36. The washer 40 serves as an abutment for the lower end of a spring 42 which is sufficiently strong to move the pump yoke 24 without yielding if the yoke is not restrained against movement by other means later to be described. Abutting the closed upper end of the cylinder 34 is a tubular spring abutment 44 which abuts the upper end of spring 42 and is slidably mounted on the reduced portion of link 30. The upper end of link 30 carries a collar or head 46 in contact with the upper surface of the end portion of abutment 44.

The action of the lost motion device will be apparent if the yoke 24 be imagined as temporarily secured against movement, and if then the lever 26 be moved downwardly, the link 30 will move upwardly carrying washer 40 on shoulder 38 and compressing spring 42 since abutment 44 is prevented from moving upwardly by the stationary yoke 24. Similarly, if the handle 26 be moved upwardly, the head 46 on link 30 will pull the abutment 44 downwardly to compress the spring 42 against washer 40 which is prevented from moving downwardly by its abutment with end cap 36 which in turn is secured to the stationary yoke 24 by the tube 34.

Connected to the pump 12 is a main power circuit consisting of a pair of conduits 48 and 50 which lead to a fluid motor 52. The latter has an output shaft 54 which may be connected by suitable means, not shown, to drive any desired load device. Shaft 54 is provided with a multiple-disk brake 56 which is normally engaged by a spring 58 which urges the pressure plate 60 to the right. The latter carries a differential piston 62 slidable in a cylinder 64 which is connected by a brake release pipe 66 to the valve block 22.

It will be seen that, whenever fluid pressure is admitted through release pipe 66, piston 62 will be shifted to the left against spring 58 to release the pressure plate from contact with the brake disks 56, thus permitting shaft 54 to turn. Preferably, a manual release lever 68 is also provided for manually camming the pressure plate 60 to the left, should it be necessary to do so without the aid of pressure fluid.

The main power circuit is provided with a bypass comprising pipes 70 and 72 which branch from the conduits 50 and 48 and lead to the valve block 22. Also connected across the main circuit are the customary overload, pressure relief valves 74 and 76 which in this case are mounted directly on the yoke 24.

The shaft 54 carries a worm 78 to drive a worm wheel 80 in turn connected with a shaft 82 carrying a cam wheel 84. The latter is provided with a generally circular edge cam surface having a notch 86. Adjacent the notch 86 on either side thereof are pivoted wings 88 biased to the position shown by spring-pressed plungers 90. The wings are pivoted at 92 to coact with a follower 94 in a manner to yield when the follower is driven out of the notch but to support the follower away from the notch until it passes the tip of a wing as the cam approaches the stopped position illustrated.

The cam 84 is also provided with a groove 96 in its face, the edges of which form a pair of cam surfaces 98 and 100. The latter cooperate with a roller 102 carried by a link 104 slidable in a bearing 106 and connected to the yoke 24 by a link 108. The shape of the cam surfaces 98 and 100, in the particular embodiment illustrated, is such as to provide a very small range of movement of yoke 24 in the position illustrated in Figures 1 and 4 and to progressively increase that range throughout the first ninety degrees of cam rotation in either direction from the position there illustrated. The remaining one hundred eighty degrees of the cam surfaces are circular in shape and spaced from one another sufficiently to permit full range of movement of yoke 24.

The lever 26 also carries pivoted thereto at its opposite end a link 110 connected to a slide bar 112 carrying a rectilinear cam bar 114 having a notch 116 coacting with a follower 118. The arrangement is such that the follower 118 can occupy the righthand position illustrated only when the lever 26 is at or near neutral position. Upon slight movement away from neutral position in either direction, the follower 118 is projected fully to the left. Both follower 118 and follower 94 are spring biased to the right into contact with their respective cam surfaces.

The valve block 22 contains a main control valve 120 which is effective to stop the motor 52 when the valve lies in the position shown in Figure 1. This action is accomplished through the medium of a bypass and brake-operating valve 122 which is spring biased to the right and may be shifted to the left by the admission of pressure fluid through a conduit 124 from the port 126 of the valve 120.

The valve 122 is provided with ports 128 and 130 connected with the bypass conduits 70 and 72, respectively. These ports are normally connected in the position shown in Figure 1 and are blocked from one another when the valve 122 is shifted to the left. This valve is further provided with a port 132 connected with conduit 66, and, in the position of the valve shown in Figure 1, this port is connected with a port 134 which is in communication with the tank through a passage 136. When the valve 122 is shifted to the left, port 132 is connected with a port 138 which is one terminus of the auxiliary pressure delivery line 20.

The delivery line 20 also communicates with the inlet side of a pair of check valves 140 and 142 which connect by passages 144 and 146 with the ports 128 and 130. By this means the main power circuit may be maintained full at all times to make up for leakage loss by maintaining the pressure of the auxiliary pump on whichever of the conduits 48 or 50 is the low pressure conduit at any time.

The delivery conduit 20 also passes through a port 148 of a relief valve 150, the lefthand end of which is subjected to pressure in the line 20 through a branch 152. An adjustable spring 154 maintains the valve closed in the position shown in Figure 1 until a predetermined pressure is built up in conduit 20, at which time the valve will shift to the right to open port 148 to a port 155 leading by a branch 156 to the tank connection 136.

The main control valve 120 has two end ports 158 and 160 which communicate with the delivery line 20, and a central port 162 which communicates with the tank through a passage 164. A port 166 communicates by a passage 168 with the left end of a pilot valve 170. The valve 120 has three effective positions. In the righthand position illustrated in Figure 1, port 126 is cut off from port 158 and connected with port 162, while port 166 is cut off from port 160 and also connected with port 162. In the middle position, port 166 is blocked, while port 126 is cut off from port 162 and connected with port 158. When the valve is shifted fully to the left, port 126 remains connected as before, while port 166 is connected with port 160.

The pilot valve 170 is a simple three-way valve having a central port 172 which is connected with a port 174 in the position shown in Figure 1 and may be cut off from this port and connected to a port 176 in the tank passage 164 whenever the valve 170 is shifted to the right. A spring-pressed detent 176 retains the valve 170 in either one of its shifted positions whenever the pressure at opposite ends of the spool is identical.

The port 172 connects by a passage 178 with a small cylinder chamber 180 adjacent the right end of valve 120. A small retracting piston 182 is slidably mounted in cylinder 180. The retracting piston 182 is slidable on the stem of valve 120, the arrangement being such that, when fluid pressure is admitted to cylinder 180, piston 182 shifts the valve to the left to its central position, this being the limit of stroke of piston 182. The valve 120 may be mechanically shifted to its extreme lefthand position by the cam 84.

Port 174 of valve 170 is connected by a passage 184 with a port 186 of a starting valve 188. In the righthand position of valve 188 illustrated in Figure 1, port 186 is connected with a port 190 which communicates with tank through passage 164. When the valve 188 is shifted to the left by action of cam 116 on follower 118, port 186 is cut off from port 190 and connected with a port 192 in the delivery conduit 20. The valve 188 also has a port 194 at its lefthand end which connects by a passage 196 with the brake release conduit 66. The port 194 is connected with port 190 in the righthand position of the valve and is cut off therefrom in the lefthand position. A port 198 communicates by a conduit 200 with the righthand end of valve 170 and is connected with the delivery conduit at port 192 when valve 188 is in its righthand position. The port 198 is cut off from the port 192 and connected with a port 202 when the valve 188 is shifted to the left. Port 202 connects with tank passage 164.

In operation, starting with the parts in the position shown in Figure 1, it will be seen that, when motor 10 is operating, pumps 12 and 16 are driven, pump 12 delivering no fluid because the yoke 24 is in the neutral position. Pump 16 delivers fluid through conduit 20 which supplies pressure fluid through conduit 200 to the right end of valve 170 and then, following on through valves 120 and 150, is supplied through check valves 140 and 142 to the two sides of the main circuit which, however, accepts no significant flow. Port 138 being blocked, there is no further path of escape from conduit 20 so that fluid will flow through passage 152 and relief valve 150 will open, permitting the full pump delivery to discharge to tank through port 155 and passages 156 and 136.

When it is desired to start a cycle of operation of the load device, for example, in the direction producing counterclockwise rotation of the cam 84, the handle 26 may be moved fully downwardly to shift the yoke 24 and cam 114 upwardly as illustrated in Figure 2. If it is desired to drive the load at maximum speed, the handle will be depressed its full distance, and correspondingly, if a slower speed is desired, a lesser movement of the handle is required. In any event, the cam surface 100 limits the upward movement of yoke 24 to a very small value, and, as the motor rotates the cam, it gradually permits yoke 24 to rise under the action of the spring 42 in the lost motion connection 32. The shifting of yoke 24 out of neutral position causes fluid to be withdrawn from conduit 48 and delivered into conduit 50, thus rotating the motor 52 at a speed proportional to the angular displacement of yoke 24 (as soon as the bypass is closed as will now be described).

The shifting of cam 114 shifted roller 118 and valve 188 fully to the left. This cuts off the pressure supplied through port 198 to valve 170 and connects this port to tank through port 202 and passage 164. Valve 170 does not move at this time, however, because no pressure fluid is admitted to its lefthand end through passage 168.

The shifting of valve 188 also admitted pressure fluid from port 192 to port 186 and through passage 184, ports 174 and 172, and passage 178 to the retracting piston cylinder 180. This shifts valve 120 to its mid position wherein ports 126 and 158 are connected. Pressure fluid from line 20 accordingly is delivered through conduit 124 to the right end of bypass and brake-control valve 122, shifting the latter to the left against the bias of its spring. Accordingly, ports 128 and 130 are cut off from one another, thus closing the bypass between conduits 48 and 50. In addition, the shifting of valve 122 connects port 132 with port 138 instead of port 134. Thus, pressure fluid is admitted from line 20 to line 66 and to the brake-release cylinder 64 to release the brake 56. It will be noted that the shifting of valve 188 blocks the port 194, thus closing this path of escape from port 132 through conduit 196. After pistons 182 and 62 have been moved to the left, pressure acting through 152 will move valve 150 to the right to permit excess fluid from pump 16 to be discharged through 146, 155, 156 and 136, and will also make up any fluid to the low pressure side of the pump and motor transmission 12, 52 by flowing through 20 past valve 142 into 146, 130, 72 and 48.

As the motor rotates, driving cam 84, the follower 94 swings the upper wing 88 back against the spring plunger 90 so that the cam surface 86 soon abuts the follower 94 after the cam is rotated through a small angle such as that illustrated in Figure 2. From this point on, as the cam rotates it will gradually shift the follower 94 and the valve 120 fully to the left, thus opening port 166 to port 160. This position of the valve 120 is illustrated in Figure 3.

Pressure fluid from line 20 is accordingly admitted through ports 160 and 166 and through conduit 168 to the left end of valve 170. Since the right end of this valve is now connected to tank, as previously described, the valve shifts, thus connecting port 172 with the tank port 176 and hence connecting cylinder 180 to exhaust through 164.

As the motor continues to rotate, the cam 84 permits yoke 24 to rise until the spring 42 is fully expanded, and the parts occupy the position shown in Figure 3. This condition maintains until the cam surface 100 again begins to push the yoke 24 downwardly, at which time the motor and load device are gradually decelerated until the parts reach the position illustrated in Figure 4. During this entire operation the handle 26 has been held in its fully downward position.

As the cam 84 approaches the position shown in Figure 4, the follower 94 rides on the outer circumferential surface of the lower wing 88 until it is permitted to drop into the notch between the wings. At this time valve 120 shifts back fully to the right carrying piston 182 along with it on the latter half of its movement, whereby fluid from chamber 180 is exhausted through 178, 172, 176 and 164. Port 126 is thus again connected to the tank port 162 which permits valve 122 to shift to the right under spring bias and discharge the oil from its right end through conduit 124, ports 126 and 162, and conduit 164 to tank. This movement of valve 122 again opens the bypass between ports 128 and 130 which accordingly carries the reduced delivery of pump 12 at its approximate neutral setting to which it is confined by cam 100. Also port 132 is again connected with port 134 to exhaust the brake-release chamber 64 through conduit 66. Thus, spring 58 again applies brake 56.

The motor 52 thus is brought to a positive stop independently of whether or not handle 26 is returned to neutral position. The motor cannot be restarted until the handle 26 is returned, however. This is because the retracting cylinder 180 is connected with tank at ports 172 and 176 of valve 170. When the handle 26 is restored to neutral position, the parts occupy the position shown in Figure 1 so that pressure fluid is admitted from port 192 to port 198 and conduit 200 to shift valve 170 again to the left and connect ports 172 and 174 so that they may receive pressure fluid to operate retracting piston 182 as soon as the valve 188 is again shifted to the left.

The device may also be stopped at any time during the cycle by returning handle 26 to neutral position. Such a stop is illustrated in Figure 5 from which it will be seen that the movement of handle 26 returns the yoke 24 to neutral position, thus stopping the delivery of fluid to motor 52. The cam 114 permits the valve 188 to shift to the right and open the connection from port 194 to port 190, thus exhausting the brake-release cylinder 64 through passages 66 and 196, ports 194 and 190, and passage 164. This opens a free escape path for the auxiliary pump delivery from line 20 through ports 138 and 132, conduit 196, ports 194 and 190 and passage 164 to tank. Accordingly, the pressure at the right end of valve 122 tends to drop permitting the valve to start shifting to the right. As soon as the valve begins to close off port 138, the pressure in line 20 will tend to rise so that a stable condition is reached in which valve 122 is acting as a relief valve to maintain pressure in line 20 at a value determined by the force of its biasing spring in relation to its righthand end area. This position of valve 122 may open the main circuit bypass although this is not necessary since the pump yoke is in neutral position.

It will be understood that an exactly analogous operation may be had in the reverse direction by shifting lever 26 upwardly, and the same cycle of movement will be made to take place. In this event, follower 102 will contact cam 98 which will govern the extent of movement of yoke 24 during accelerating and decelerating portions of the cycle in exactly the same manner that cam 100 controls it during a forward cycle. Thus, in either direction of rotation, the load device is under full manual control at all times with a superimposed automatic control which insures a full stop after a predetermined amount of motor rotaton. During a reverse cycle, fluid required for replenishing purposes is taken into the main circuit line 50 through valve 140 and conduit 70.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination of a reversible, variable stroke pump, a fluid motor and a main power circuit connecting the pump with the motor, a member shiftable to vary the stroke of the pump and having a neutral position in which the pump stroke is zero, manually operable control means for shifting said member, said means including a yielding lost motion connection, control means driven by the motor for returning the member to approximate neutral position after a predetermined movement of the motor, and means controlled jointly by the manual control means and by the motor-driven control means for stopping the motor when said member has been shifted to approximate neutral position and preventing restarting of the motor until after the manual control means has been returned to neutral position.

2. In a hydraulic power transmission system the combination of a pump, a fluid motor and a main power circuit connecting the pump with the motor, a member shiftable to vary the rate of fluid delivery to the motor and having a neutral position in which the rate of delivery is zero, manually operable control means for shifting said member, said means including a yielding lost motion connection, control means driven by the motor for returning the member to approximate neutral position after a predetermined movement of the motor, and means controlled jointly by the manual control means and by the motor-driven control means for stopping the motor when said member has been shifted to approximate neutral position and preventing restarting of the motor until after the manual control means has been returned to neutral position.

3. In a hydraulic power transmission system the combination of a pump, a fluid motor and a main power circuit connecting the pump with the motor, a member shiftable to vary the rate of fluid delivery to the motor and having a neutral position in which the rate of delivery is zero, manually operable control means for shifting said member, said means including a yielding lost motion connection, control means driven by the motor for returning the member to approximate neutral position after a predetermined movement of the motor, and means controlled jointly by the manual control means and by the motor-driven control means for bypassing the power circuit to stop the motor when said member has been shifted to approximate neutral position and preventing restarting of the motor until after the manual control means has been returned to neutral position.

4. In a hydraulic power transmission system the combination of a pump, a fluid motor and a main power circuit connecting the pump with the motor, a member shiftable to vary the rate of fluid delivery to the motor and having a neutral position in which the rate of delivery is zero, manually operable control means for shifting said member, said means including a yielding lost motion connection, control means driven by the motor for initially limiting the degree of movement of said member to control acceleration of the motor and for thereafter again limiting said movement to decelerate the motor after a predetermined movement of the motor, and means controlled jointly by the manual control means and by the motor-driven control means for stopping the motor when said member has been shifted to approximate neutral position and preventing restarting of the motor until after the manual control means has been returned to neutral position.

5. In a hydraulic power transmission system the combination of a pump, a fluid motor and a main power circuit connecting the pump with the motor, a member shiftable to vary the rate of fluid delivery to the motor and having a neutral position in which the rate of delivery is zero, manually operable means for shifting said member, said means including a yielding lost motion connection, a cam driven by the motor, and follower means connected with said member to limit the range of movement thereof during starting and to again limit said range after a predetermined movement of the motor.

6. In a hydraulic power transmission system the combination of a pump, a fluid motor and a main power circuit connecting the pump with the motor, a main valve shiftable to control the stopping and starting of the motor, a cam driven by the motor to control shifting of the valve to stopping position after predetermined movement of the motor, pressure-operated means for shifting the main valve to starting position, a pilot valve for controlling the admission of pressure fluid to said means, double-acting servomotor means for shifting the pilot valve, a starting valve for controlling the admission and exhaust of pressure fluid at one side of the servomotor and also controlling the admission of pressure fluid to shift the main valve, and means associated with the main valve for controlling the admission and exhaust of pressure fluid to the other side of the servomotor in response to cam-controlled shifting of the main valve at the stopping and starting, respectively, of the motor.

7. In a hydraulic power transmission system the combination of a pump, a fluid motor and a main power circuit connecting the pump with the motor, a main valve shiftable to control the stopping and starting of the motor, a cam driven by the motor to control shifting of the valve to stopping position after predetermined movement of the motor, pressure-operated means for shifting the main valve to starting position, a pilot valve for controlling the admission of pressure fluid to said means, means for shifting the pilot valve in one direction to cause starting of the motor, and means controlled by the main valve after starting to prevent restarting of the motor until after the pilot valve shifting means has been restored to stopping position.

WARREN E. ROUSE.
JAMES ROBINSON.
JOHN D. DIETIKER.